(12) United States Patent
Copeland et al.

(10) Patent No.: US 8,881,534 B2
(45) Date of Patent: Nov. 11, 2014

(54) GAS TURBINE ENGINE SHAFT COUPLER

(75) Inventors: Andrew D. Copeland, Greenwood, IN (US); Al Cookerly, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1196 days.

(21) Appl. No.: 12/636,504

(22) Filed: Dec. 11, 2009

(65) Prior Publication Data

US 2010/0162723 A1    Jul. 1, 2010

Related U.S. Application Data

(60) Provisional application No. 61/203,768, filed on Dec. 29, 2008.

(51) Int. Cl.
| F02C 3/10 | (2006.01) |
| F16D 25/0632 | (2006.01) |
| F16D 11/04 | (2006.01) |
| F16H 3/08 | (2006.01) |
| F02C 7/36 | (2006.01) |
| F02N 15/02 | (2006.01) |

(52) U.S. Cl.
CPC ............... F02C 7/36 (2013.01); F02N 15/025 (2013.01); F05D 2260/85 (2013.01)
USPC ...... 60/792; 60/39.163; 192/85.21; 192/66.2; 74/330; 74/333

(58) Field of Classification Search
USPC ............... 60/341, 435, 778, 788, 786, 39.13, 60/39.163
See application file for complete search history.

(56) References Cited

U.S. PATENT DOCUMENTS

| 3,679,033 | A |   | 7/1972 | Wagner | |
| 4,226,318 | A | * | 10/1980 | Morgan | 192/85.49 |
| 4,271,724 | A |   | 6/1981 | Morscheck | |
| 5,951,426 | A |   | 9/1999 | Forrest | |
| 6,648,117 | B2 |   | 11/2003 | Shoji et al. | |
| 6,676,555 | B2 | * | 1/2004 | Duan | 475/231 |
| 6,960,107 | B1 |   | 11/2005 | Schaub et al. | |
| 7,552,591 | B2 | * | 6/2009 | Bart et al. | 60/792 |
| 2003/0114264 | A1 |   | 6/2003 | Duan | |
| 2004/0065091 | A1 | * | 4/2004 | Anderson | 60/778 |
| 2004/0159524 | A1 |   | 8/2004 | Carpenter et al. | |
| 2007/0022735 | A1 | * | 2/2007 | Henry et al. | 60/39.162 |

* cited by examiner

*Primary Examiner* — Lindsay Low
*Assistant Examiner* — Syed O Hasan
(74) *Attorney, Agent, or Firm* — Krieg DeVault LLP

(57) ABSTRACT

A gas turbine engine is provided that includes a gearbox operable to selectively couple a relatively high pressure spool shaft to a relatively low pressure spool shaft. In one form the gearbox includes a cone clutch that engages a male member of the cone clutch to a female member of the cone clutch during an engine start of the gas turbine engine. A relatively high pressure of a working fluid can be used to bring the male member and the female member together. A spring can also be used to urge the male member and the female member apart when the working fluid is at a relatively low pressure.

19 Claims, 3 Drawing Sheets

GAS TURBINE ENGINE SHAFT COUPLER

CROSS REFERENCE TO RELATED APPLICATIONS

The present application claims the benefit of U.S. Provisional Patent Application 61/203,768, filed Dec. 29, 2008, and is incorporated herein by reference.

TECHNICAL FIELD

The present invention generally relates to gas turbine engines, and more particularly, but not exclusively, to devices used for coupling shafts of gas turbine engines.

BACKGROUND

Starting a gas turbine engine in an efficient and/or effective manner remains an area of interest. Some existing systems have various shortcomings relative to certain applications. Accordingly, there remains a need for further contributions in this area of technology.

SUMMARY

One embodiment of the present invention is a unique mechanism that selectively couples shafts of gas turbine engines. Other embodiments include apparatuses, systems, devices, hardware, methods, and combinations for coupling shafts of gas turbine engines. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
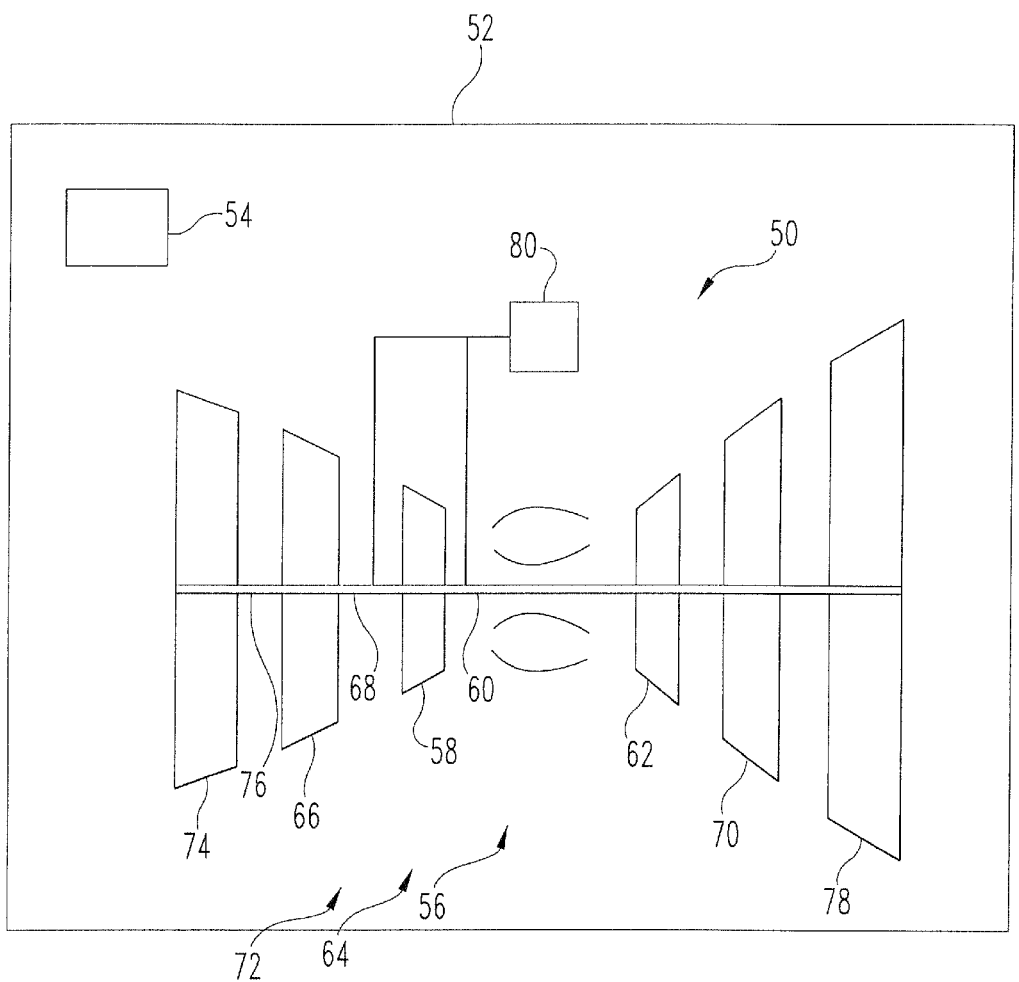
FIG. 1 is a schematic representation of a gas turbine engine including one embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a schematic representation of one form of an aircraft engine 50 used as a powerplant for an aircraft 52. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion and other applications known to one of ordinary skill in the art.

A controller 54 is provided to monitor and control engine operations. The controller 54 can be a single component, or a collection of operatively coupled components. The controller 54 can be comprised of digital circuitry, analog circuitry, or a hybrid combination of both of these types. Also, the controller 54 can be programmable, an integrated state machine, or a hybrid combination thereof. The controller 54 can include one or more Arithmetic Logic Units (ALUs), Central Processing Units (CPUs), memories, limiters, conditioners, filters, format converters, or the like which are not shown to preserve clarity. In one form, the controller 54 is of a programmable variety that executes algorithms and processes data in accordance with operating logic that is defined by programming instructions (such as software or firmware). Alternatively or additionally, operating logic for the controller 54 can be at least partially defined by hardwired logic or other hardware. In one particular form, the controller 54 is configured to operate as a Full Authority Digital Engine Control (FADEC); however, in other embodiments it may be organized/configured in a different manner as would occur to those skilled in the art. It should be appreciated that the controller 54 can be exclusively dedicated to performing an engine start sequence, among other possible operations.

The aircraft engine 50 is in the form of a gas turbine engine and includes a high pressure (HP) spool 56, an intermediate pressure (IP) spool 64 and a low pressure (LP) spool 72. The HP spool 56 includes an HP compressor 58, an HP shaft 60, and an HP turbine 62. The IP spool 64 includes an IP compressor 66, an IP shaft 68, and an IP turbine 70. The LP spool includes an LP compressor 74, an LP shaft 76, and an LP turbine 78. In some forms the aircraft engine 50 can include a fewer number of spools or a greater number of spools. For example, one non-limiting embodiment of the aircraft engine 50 can include only two spools.

A gearbox 80 is depicted in FIG. 1 and is used to selectively couple two spools together. In the illustrative form the gearbox 80 is depicted coupling the HP spool 56 to the IP spool 64 through the HP shaft 60 and IP shaft 68 and is in the form of a step aside gearbox. Other types of gearboxes can be used in other embodiments. The HP shaft 60 and/or IP shaft 68 are coupled to the gearbox 80 through lay shafts in the illustrative embodiment, but in other embodiments the HP shaft 60 and/or IP shaft 68 can be directly received by the gearbox 80. The gearbox 80 can couple the HP shaft 60 and IP shaft 68 to rotate at the same rotational speed, but in some embodiments the gearbox 80 can be configured such that the HP shaft 60 and IP shaft 68 rotate at different rotational speeds.

The gearbox 80 is used to selectively couple the spools during an engine start sequence. The engine start sequence can be determined by the controller 54. For example, during an engine start sequence it may be beneficial to rotate the HP spool 56 and the IP spool 64 at the same speed until the engine achieves a sufficient pressure ratio for combustion. The controller 54 can be used to monitor engine operation and decouple the HP spool 56 from the IP spool 64 when the engine has completed a start sequence. The start sequence can be determined on the basis of a time duration from a specific event and additionally and/or alternatively can be determined on engine performance, a desired parameter or measured value, or combinations thereof, among other possibilities.

Figure 2:
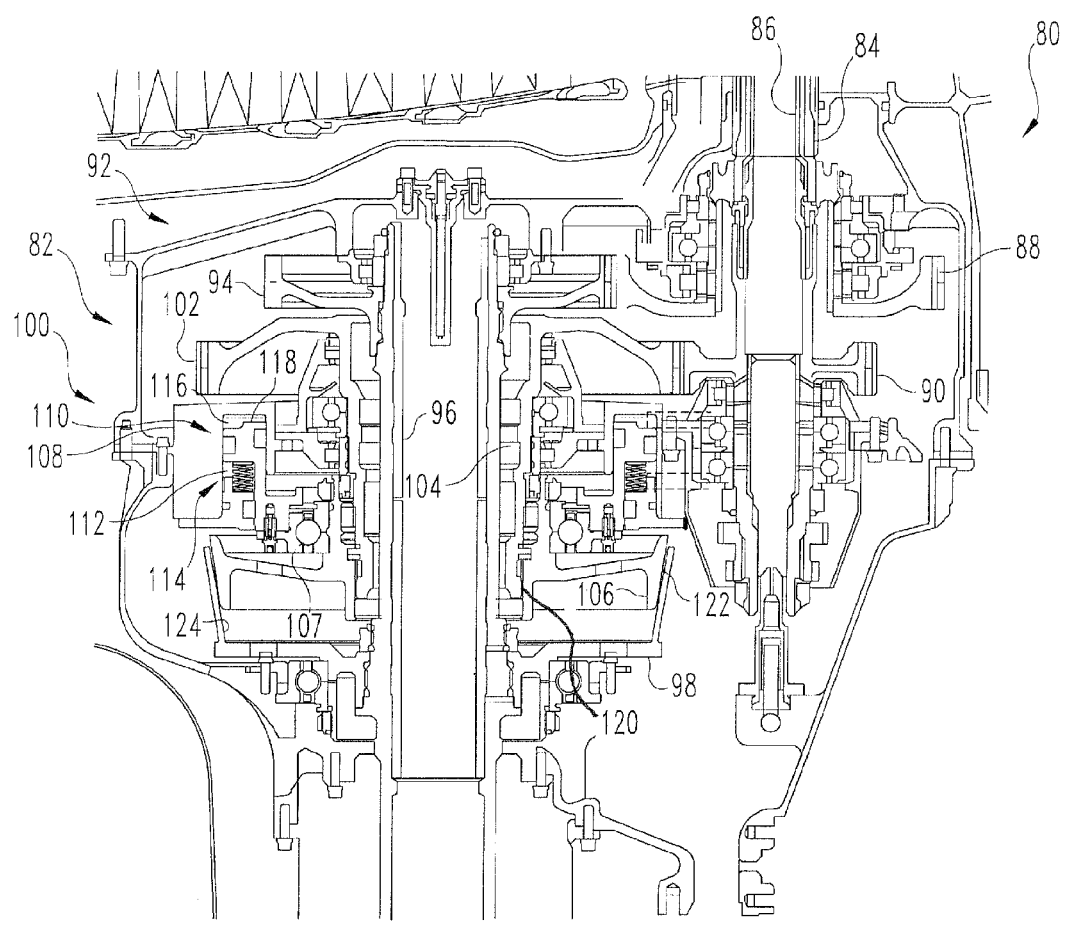
FIG. 2 is a view of one embodiment of a gear box of the present application.
Figure 3:
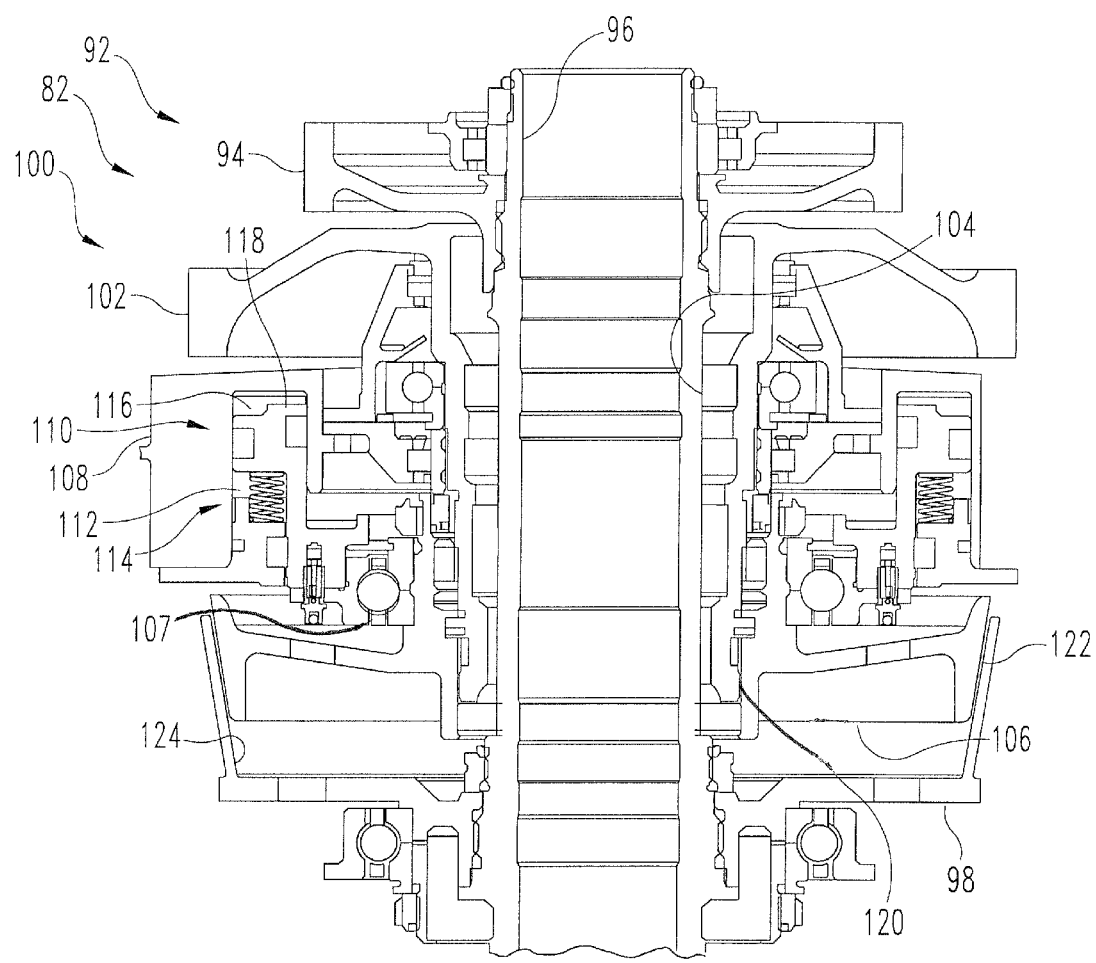
FIG. 3 is a view of one embodiment of a coupling assembly of the present application.

Turning now to FIGS. 2 and 3, one embodiment of the gearbox 80 is depicted along with a coupling assembly 82. The gearbox 80 is operable to receive an input shaft 84 and an output shaft 86. As used herein, the terms "input" and "output" are not meant to imply a drive and a driven shaft, but rather are used to distinguish between two separate shafts that enter the gearbox 80. In the illustrative embodiment the input shaft 84 is coupled with the HP shaft 60 (shown in FIG. 1) and the output shaft 86 is coupled with the IP shaft 68 (shown in FIG. 1). In other embodiments, the input shaft 84 could be coupled with the IP shaft 68 (shown in FIG. 1), and the output shaft 86 can be coupled with the HP shaft 60. As will be appreciated, other combinations are also possible. Any number of lay shafts may be used between the input shaft 84 and HP shaft 60. Additionally and/or alternatively, gearing also can be used between the input shaft 84 and HP shaft 60, as well as between the output shaft 86 and the IP shaft 68. In some forms the input shaft 84 can be the HP shaft 60. Additionally and/or alternatively, in some forms the output shaft 86 can be the IP shaft 68.

The input shaft 84 includes a gear 88 and the output shaft 86 includes a gear 90. Either or both of gears 88 and 90 can be formed integral to the shafts 84 and 86, respectively, but in other forms the gears 88 and 90 can be attached to the shafts 84 and 86. As will be appreciated with the discussion further below, the gears 88 and 90 interact with gears coupled with the coupling assembly 82. The gear 88 and/or gear 90 can take a variety of forms including spur gears, helical gears and beveled gears, to set forth just a few non-limiting examples.

The coupling assembly 82 is used to rotatingly couple the input shaft 84 to the output shaft 86 and it includes a gear shaft 92 operable to be coaxially rotatable with a gear shaft 100. In the illustrative form, no bearings are disposed between the gear shaft 92 and the gear shaft 100. In some forms, however, a bearing(s) may be disposed between the gear shafts 92 and 100. The gear shaft 92 includes a gear 94, a shaft 96 and a member 98. The gear 94 is operable to engage the gear 88 that is coupled to the input shaft 84. The gear 94 can be disposed at the end of the shaft 96 as is depicted in the illustrative embodiment but in other embodiments the gear 94 can be disposed at an intermediate location between the ends of the shaft 96. The gear 94 is in a form of a complementary member that engages gear 88 and therefore may take the shape consistent with the form of gear 88. For example, the gear 94 can be a variety of forms including spur gears, helical gears and beveled gears, to set forth just a few non-limiting examples. The gear ratio of the engaged gear 94 and gear 88 can be 1:1 or any other value.

The member 98 includes a friction surface 124 that can be integrally formed in the member 98 or attached thereto. The friction surface 124 can be one surface or multiple surfaces. The friction surface 124 can be any surface having attributes associated with abradable surfaces or wear surfaces in the brake, clutch, and/or transmission arts such as, but not limited to, toughness, strength, heat resistance, adequate frictional properties, and/or relatively long life. In some forms the friction surface 124 can be textured, roughened, and or grooved. The friction surface 124 can be made from a variety of materials including, but not limited to, steel, bronze, iron, iron-bronze, metallic ceramic, and metallic graphite.

The gear shaft 100 includes a gear 102, a shaft 104 and a movable member 106. The gear 102 is operable to engage the gear 90 that is coupled to the output shaft 86. The gear 102 can be disposed at the end of the shaft 104 as is depicted in the illustrative embodiment but in other embodiments, the gear 102 can be disposed at an intermediate location between the ends of the shaft 104. The gear 102 is in a form of a complementary member that engages gear 90 and therefore can take the shape consistent with the form of gear 90. For example, the gear 102 can be a variety of forms including spur gears, helical gears and beveled gears, to set forth just a few non-limiting examples. The gear ratio of the engaged gear 90 and gear 102 can be 1:1 or any other value.

The movable member 106 is coupled to a piston 110 through a bearing race 107 and to the shaft 104 through a spline arrangement that allows the movable member 106 to move relative to the shaft 104. The bearing race 107 can include bearings such as ball bearings, but other bearing arrangements are also contemplated. In addition, other types of mechanisms and/or surface geometries can be used in place of splines 120 to allow the moveable member 106 to move relative to the shaft 104. To set forth one non-limiting example, the splines 120 could be replaced by guide pins. The splines 120 can be arranged to allow the movable member 106 to translatingly slide relative to the shaft 104 but in other embodiments the splines 120 can be arranged such that the movable member 106 is rotated and translated in a manner similar to screw threads. The movable member 106 includes a friction surface 122 which is operable to engage a friction surface 124 of the member 98.

The friction surface 122 can be integrally formed in the movable member 106 or attached thereto. The friction surface 122 can be one surface or multiple surfaces. The friction surface 122 can be any surface having attributes associated with abradable surfaces or wear surfaces that may be found in the brake, clutch, and/or transmission arts such as, but not limited to, toughness, strength, heat resistance, adequate frictional properties, and/or relatively long life. In some forms the friction surface 122 can be textured, roughened, and or grooved. The friction surface 122 can be made from a variety of materials including, but not limited to, steel, bronze, iron, iron-bronze, metallic ceramic, and metallic graphite.

The coupling assembly 82 includes a clutch mechanism used to couple the input shaft 84 and output shaft 86. The clutch mechanism includes the friction surfaces 122 and 124, a housing 108, the piston 110, an elastic device 112 and a mechanical stop 114. The housing 108 is fixed relative to the aircraft engine 50 (shown in FIG. 1) and includes a cavity 116 operable to receive a working fluid. In one form the working fluid is engine oil, but in other embodiments it can take on different forms. The cavity is capable of receiving working fluid at a variety of temperatures and pressures.

The piston 110 includes a pressure member 118 disposed within the cavity 116 and operable to receive the working fluid such that a high pressure of the working fluid forces the pressure member 118 away from a wall of the housing 108, thus making the space between the pressure member 118 and the wall of the housing 108 larger. The piston 110 can be moved at a variety of rates. The piston 110 is coupled to the movable member 106 such that movement of the piston 110 generates movement in moveable member 106.

The elastic device 112 provides a force to the piston 110 and in the illustrative embodiment is disposed between the piston 110 and the housing 108. The elastic device 112 can take a variety of forms including a helical coil spring, a leaf spring, and a cantilever spring, to set forth just a few non-limiting examples among many examples of devices capable of storing and releasing energy. In some forms the elastic device 112 can be an elastomeric material. The coupling assembly 82 can include a single elastic device 112, but in some embodiments multiple elastic devices 112 can also be used. The elastic devices 112 can be coupled at locations relative to the housing 108 and piston 110 other than the configuration depicted in the illustrative embodiment. For example, the elastic device 112 could be disposed within the cavity 116 between the pressure member 118 and the housing 108. Furthermore, multiple elastic devices 112 could be disposed on both sides of the pressure member 118.

The elastic devices 112 provide a force to return the piston 110 in a direction when a pressure of the working fluid within cavity 116 is at a relatively low pressure. For example, if the pressure in cavity 116 in the illustrative embodiments is high enough, the piston 110 moves in a direction to compress the elastic device 112. When a pressure of the working fluid is reduced the elastic device 112 can provide a force sufficient to move the piston 110 in a direction to reduce the volume of working fluid in the cavity 116. Various other arrangements are also contemplated herein.

The member 98 and movable member 106, and their associated friction surfaces 124 and 122, respectively, are depicted in the form of a cone clutch. In particular, member 98 and friction surface 124 form the female member of the cone clutch, and movable member 106 and friction surface 122 form the male member. In some forms the member 98 can take the form of a male member and the movable member 106 can take the form of a female member of the cone clutch. The cone clutch surfaces can be shaped to prevent/mitigate taper lock. In addition, the cone angle of the cone clutch can be chosen to provide an axial length of wear before the friction surfaces are fully worn. In some embodiments, the member 98 and movable member 106 can take forms other than as a cone clutch. In one non-limiting form, the member 98 and movable member 106 can take the form of a multi-plate clutch.

In operation, when a pressure of the working fluid is relatively high, the piston 110 is urged to move away from the wall of the housing 108 thus moving the movable member 106 toward the member 98. When the friction surface 122 of movable member 106 engages the friction surface 124 of the member 98, the gear shaft 92 is then coupled with the gear shaft 100. Furthermore, because gear shaft 100 is coupled to the output shaft 86 via gears 90 and 102, and because gear shaft 92 is coupled to the input shaft 84 through gears 88 and 94, rotation of the input shaft 84 causes rotation of the output shaft 86. The input shaft 84 and output shaft 86 can be coupled in this manner during an engine start sequence of the aircraft engine 50 (see FIG. 1). The engine start sequence, furthermore, can occur either during a ground start or during flight, such as might follow an engine out event. When the aircraft engine 50 has completed the engine start sequence, the pressure of the working fluid can be relatively reduced which, through the elastic member 112, causes the input shaft 84 to decouple from the output shaft 86.

One aspect of the present application includes a gas turbine engine having high pressure spool shaft selectively coupled to an intermediate pressure spool shaft through a gear box. The gear box includes a cone clutch operable to couple coaxial gear shafts together. One of the coaxial gear shafts is itself coupled to the high pressure spool shaft and the other of the coaxial gear shafts is coupled to the intermediate pressure spool shaft. In one form the cone clutch is engaged during the engine start to couple the high pressure spool shaft to the intermediate pressure spool shaft, and is disengaged after the engine start to allow the high pressure spool shaft to rotate independently of the intermediate pressure spool shaft.

Another aspect of the present application provides an apparatus comprising a housing having a cavity, a pressure piston member having an engaged position and a disengaged position and a pressure surface at least partially received in the cavity, the pressure surface operable to receive a working fluid, an elastic device coupled between the pressure piston member and the housing and operable to return the pressure piston member to the disengaged position when a working fluid pressure is at a relatively low pressure, a first friction surface operable to move in response to the piston pressure member, a second friction surface operable to receive the first friction surface when the working fluid pressure is at a relatively high pressure and urges the pressure piston member to the engaged position, a first gas turbine engine spool shaft operable to be driven by a first turbine and operably coupled with the first friction surface, a second gas turbine engine spool shaft operable to be driven by a second turbine and operably coupled with the second friction surface, and wherein the working fluid pressure is at a relatively high pressure during an engine start of a gas turbine engine and is at the relatively low pressure after the engine start.

One feature of the present application provides a mechanical stop operable to limit a motion of the first friction surface.

Yet another feature of the present application provides wherein the mechanical stop includes a mechanical stop structure disposed in the cavity, a piston mechanical stop structure included in the pressure piston member, wherein the mechanical stop structure and the piston mechanical stop structure are operable to interfere with movement of the pressure piston member.

Still another feature of the present application provides wherein the first friction surface and the second friction surface form a cone clutch.

Still a further feature of the present application provides wherein the first friction surface includes a male cone clutch member and the second friction surface includes a female cone clutch member.

Yet still a further feature of the present application provides wherein the first friction surface is disposed at an end of a first gear shaft and the second friction surface is disposed at the end of a second gear shaft.

Still yet a further feature of the present application provides wherein the first friction surface is slidingly coupled with the gear shaft.

Yet a further feature of the present application provides wherein the first friction surface includes a splined surface and the gear shaft includes a complementary splined surface.

Yet another feature of the present application provides wherein the first friction surface is a male cone clutch member.

Still another feature of the present application provides wherein the working fluid is engine oil.

Yet another aspect of the present application provides an apparatus comprising a gas turbine engine gearbox having a first gear shaft and a second gear shaft operable to be selectively coupled, the first gear shaft having a first portion with a gear and a slidable second portion with a friction surface, the second gear shaft having a first portion with a gear and a second portion with a friction surface, an actuation device having an engaged position and a disengaged position, the actuation device operable to move the slidable second portion of the first gear shaft into contact with the friction surface of the second gear shaft in the engaged position and move the slidable second portion away from the friction surface of the second gear shaft in the disengaged position, and wherein the actuation device is energized to the engaged position during an engine start of the gas turbine engine and is de-energized to the disengaged position after the engine start.

One feature of the present application provides wherein the first gear shaft is coupled to an intermediate pressure spool shaft and the second gear shaft is coupled to a high pressure spool shaft.

Another feature of the present application provides wherein the actuation device operates on the basis of a working fluid pressure and an elastic device, a relatively high working fluid pressure energizes the actuation device to the engaged position, and the elastic device de-energizes the actuation device to the disengaged position.

Yet another feature of the present application provides wherein the friction surface of the first gear shaft forms a male member of a cone clutch, and the friction surface of the second gear shaft forms a female member of the cone clutch.

Still another feature of the present application provides wherein the friction surface of the first gear shaft forms a male member of a cone clutch, and the friction surface of the second gear shaft forms a female member of the cone clutch.

Still a further aspect of the present application provides an apparatus comprising a gas turbine engine having a first pressure spool and a second pressure spool operable to rotate independently during an operational state and to rotate together during an engine start state, and a gearbox having a means for selectively coupling the first pressure spool and the second pressure spool during the engine start state.

Yet a further aspect of the present application provides a method comprising supplying relatively high pressure working fluid to a chamber of a gas turbine engine gearbox clutch during an engine start sequence, moving a slidable portion of a first shaft in response to the supplying, engaging a friction plate coupled to the slidable portion with a friction plate of a second shaft, and sympathetically rotating a first pressure spool shaft of the gas turbine engine with a second pressure spool shaft of the gas turbine engine, the first pressure spool shaft rotatingly coupled to the first shaft and the second pressure spool shaft rotatingly coupled to the second shaft.

Yet still a further feature of the present application provides reducing the pressure in the working fluid.

Still another feature of the present application provides disengaging the friction plate coupled to the slidable end from the friction plate of a second gear shaft after the engine start sequence.

Yet still another feature of the present application provides applying a spring force to a piston coupled to the slidable end of a first gear shaft, the spring force urging the piston to disengage the friction plate coupled to the grooved end from the friction plate of a second gear shaft.

Yet a still further aspect of the present application provides a method comprising supplying relatively high pressure working fluid to a chamber of a gas turbine engine gearbox clutch during an engine start sequence, moving a slidable portion of a first shaft in response to the supplying, engaging a friction plate coupled to the slidable portion with a friction plate of a second shaft, and rotating a first pressure spool shaft of the gas turbine engine with a second pressure spool shaft of the gas turbine engine, the first pressure spool shaft rotatingly coupled to the first shaft and the second pressure spool shaft rotatingly coupled to the second shaft.

A still further aspect of the present application provides an apparatus comprising a multi-spool gas turbine engine having a first gas turbine engine spool shaft operable to be driven by a first turbine and a second gas turbine engine spool shaft operable to be driven by a second turbine, a fluid driven actuator capable of receiving a working fluid pressurizable from a relatively low pressure to a relatively high pressure to move a movable member of the fluid driven actuator, a first friction surface rotatingly coupled with the first gas turbine engine spool shaft and operable to move in response to the movable member of the actuator, a second friction surface rotatingly coupled with the second gas turbine engine spool shaft and operable to be selectively engaged with the first friction surface, and wherein the working fluid is at the relatively high pressure during an engine start of the multi-spool gas turbine engine and is at the relatively low pressure after the engine start such that the first friction surface and the second friction surface are in an engaged position during the engine start and are in a disengaged position when the working fluid is at a relatively low pressure.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a multi-spool gas turbine engine having a first gas turbine engine spool shaft operable to be driven by a first turbine and a second gas turbine engine spool shaft operable to be driven by a second turbine;
   a first gear shaft having a first drive gear rotatably disposed within a gearbox;
   a second gear shaft having a second drive gear, the second gear shaft rotatably disposed within the first gear shaft and rotatable about a common axis with the first gear shaft, the first and second gear shafts extending along the common axis between first and second ends and the first and second drive gears being disposed proximate one end of each corresponding gear shaft;
   a fluid driven actuator capable of receiving a working fluid pressurizable from a relatively low pressure to a relatively high pressure to move a movable member of the fluid driven actuator;
   a first friction surface rotatingly coupled with the first gear shaft and operable to move along the common axis between the first and second ends in response to the movable member of the actuator;
   a second friction surface rotatingly coupled with the second gear shaft and operable to be selectively engaged with the first friction surface;
   wherein the first and second friction surfaces are disposed proximate the other end of the first and second gear shafts opposite of the first and second drive gears;
   wherein the first and second drive gears are coupled with corresponding gears that are connected to the first and second spool shafts respectively; and
   wherein the working fluid is at the relatively high pressure during an engine start of the multi-spool gas turbine engine and is at the relatively low pressure after the engine start such that the first friction surface and the second friction surface are in an engaged position to couple the first and second spool shafts together during the engine start and are in a disengaged position when the working fluid is at a relatively low pressure.

2. The apparatus of claim 1, which further includes:
   an actuation housing having a working fluid cavity;
   an energy member coupled between a pressure piston member and the actuation housing and operable to return the pressure piston member to the disengaged position when a working fluid pressure is at a relatively low pressure; and wherein the movable member includes a pressure member having a pressure surface at least partially received in the working fluid cavity, the pressure surface operable to receive a working fluid.

3. The apparatus of claim 2, which further includes:
a mechanical stop operable to limit a motion of the first friction surface and disposed in the working fluid cavity;
a piston mechanical stop structure included in the pressure piston member;
and
wherein the mechanical stop and the piston mechanical stop structure are operable to interfere with movement of the pressure piston member.

4. The apparatus of claim 1, wherein the first friction surface and the second friction surface form a cone clutch.

5. The apparatus of claim 1, wherein the first friction surface includes a male cone clutch member and the second friction surface includes a female cone clutch member.

6. The apparatus of claim 1, wherein the first friction surface is slidingly coupled with the first gear shaft, the first gear shaft forming part of a step aside gearbox.

7. The apparatus of claim 6, wherein the first friction surface is coupled to the first gear shaft through a splined surface and the first gear shaft includes a complementary splined surface.

8. The apparatus of claim 6, wherein the first friction surface is a male cone clutch member.

9. The apparatus of claim 6, wherein the working fluid is engine oil.

10. An apparatus comprising:
a gas turbine engine gearbox having a first gear shaft and a second gear shaft, each gear shaft having first and second opposing ends, the second gear shaft rotatable within the first gear shaft and operable to be selectively coupled, the first gear shaft having a first portion with a gear extending from the first end and a slidable second portion with a friction surface positioned adjacent the second end, wherein the slidable second portion is slidingly movable between the first and second ends of the first gear shaft, the second gear shaft having a first portion with a gear extending from the first end and a second portion with a friction surface positioned adjacent the second end;
an actuation device having an engaged position and a disengaged position, the actuation device operable to move the slidable second portion of the first gear shaft into contact with the friction surface of the second gear shaft in the engaged position and move the slidable second portion away from the friction surface of the second gear shaft in the disengaged position; and
wherein the actuation device is energized to the engaged position during an engine start of the gas turbine engine and is de-energized to the disengaged position after the engine start.

11. The apparatus of claim 10, which further includes a gas turbine engine, wherein the first gear shaft is coupled to an intermediate pressure spool shaft and the second gear shaft is coupled to a high pressure spool shaft.

12. The apparatus of claim 10, wherein the actuation device operates on the basis of a working fluid pressure and an elastic device, a relatively high working fluid pressure energizes the actuation device to the engaged position, and the elastic device de-energizes the actuation device to the disengaged position.

13. The apparatus of claim 12, wherein the friction surface of the first gear shaft forms a male member of a cone clutch, and the friction surface of the second gear shaft forms a female member of the cone clutch.

14. The apparatus of claim 10, wherein the friction surface of the first gear shaft forms a male member of a cone clutch, and the friction surface of the second gear shaft forms a female member of the cone clutch.

15. An apparatus comprising:
a gas turbine engine having a first pressure spool and a second pressure spool operable to rotate independently during an operational state and to rotate together during an engine start state; and
a gearbox having a means for selectively coupling the first pressure spool and the second pressure spool during the engine start state, wherein the means for selectively coupling includes first and second shafts rotatable about an axis, wherein the second shaft is positioned within the first shaft, each of the first and second shafts include friction couplings positioned at one end thereof and a gear extending from the other end thereof; wherein one of the friction couplings is moveable along the axis between the first and second ends.

16. A method comprising:
supplying relatively high pressure working fluid to a chamber of a gas turbine engine gearbox clutch during an engine start sequence;
rotating a first gear shaft having first and second ends with a first gear connected thereto adjacent the first end thereof;
rotating a second gear shaft having first and second ends within the first gear shaft, the second gear shaft having a second gear connected thereto adjacent the first end thereof;
moving a slidable portion connected to the first gear shaft between the first and second ends in response to the supplying;
engaging a friction plate coupled to the slidable portion with a friction plate connected adjacent the second end of the second gear shaft to couple to the first and second gear shafts together; and
rotating a first pressure spool shaft of the gas turbine engine with a second pressure spool shaft of the gas turbine engine, the first pressure spool shaft rotatingly coupled to the first gear shaft and the second pressure spool shaft rotatingly coupled to the second gear shaft, wherein the first and second pressure spools are coupled together during the engine start sequence.

17. The method of claim 16, which further includes reducing the pressure in the working fluid after the engine start sequence.

18. The method of claim 17, which further includes disengaging the friction plate coupled to the slidable portion from the friction plate of the second gear shaft after the engine start sequence.

19. The method of claim 17, which further includes applying a spring force to a piston coupled to the slidable portion of the first gear shaft, the spring force urging the piston to disengage the friction plates of the first and second gear shafts.

* * * * *